(12) United States Patent
Nowottnick (10) Patent No.: US 11,427,160 B2
(45) Date of Patent: Aug. 30, 2022

(54) FIELD SUPERPOSITION METHOD AND SYSTEM

(71) Applicant: NXP B.V., Eindhoven (NL)

(72) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/161,132

(22) Filed: Jan. 28, 2021

(65) Prior Publication Data
US 2022/0089125 A1 Mar. 24, 2022

(30) Foreign Application Priority Data

Feb. 28, 2020 (EP) ..................................... 20160095

(51) Int. Cl.
*B60R 25/24* (2013.01)
*H01Q 3/34* (2006.01)
(Continued)

(52) U.S. Cl.
CPC ........ *B60R 25/245* (2013.01); *G07C 9/00309* (2013.01); *H01Q 3/34* (2013.01); *H04B 17/318* (2015.01)

(58) Field of Classification Search
CPC .... B60R 25/245; H01Q 3/34; G07C 9/00309; H04B 17/318
See application file for complete search history.

(56) References Cited

U.S. PATENT DOCUMENTS 6,937,136 B2 * 8/2005 Greenwood ......... H01Q 1/3266
340/5.61
8,442,719 B1 * 5/2013 Nowottnick ....... G07C 9/00309
701/49
(Continued)

FOREIGN PATENT DOCUMENTS

EP 1189306 A1 3/2002
EP 2498226 A2 9/2012
(Continued)

*Primary Examiner* — Thomas D Alunkal (57) ABSTRACT

Disclosed is a method of wireless communication between a vehicle base station and a transponder, the method comprising: i) driving first and second antennae on the vehicle by the vehicle base station using first driving currents, the first antenna being separated from the transponder by a portion of a vehicle in which the vehicle base station resides; ii) detecting three separate mutually orthogonal vector components of the respective fields emitted by the first and second antennae and received at the transponder; iii) calculating superposition factors for the first and second antennae based upon the separate vector components; iv) concurrently driving the first and second antennae using the same phase, respectively using the first driving currents multiplied by the calculated superposition factors; v) detecting three mutually orthogonal vector components of a superposed signal including signals from both antennae received at the transponder; vi) determining whether two of the three detected vector components are above a threshold noise level; vii) if fewer than two of the three detected vector components are above the threshold noise level, repeating step iv) with one of the first and second antennae being driven by the first driving current multiplied by the calculated superposition factors and by an adjustment factor; and viii) if two of the three detected vector components are above the threshold noise level, authenticating the transponder in response to the detected superposed vector components being within an error-based range of the sum of the separate vector components for each of the first and second antennae as multiplied respectively by the superposition factors for the first and second antennae.

20 Claims, 4 Drawing Sheets

(51) Int. Cl.
*G07C 9/00* (2020.01)
*H04B 17/318* (2015.01)

(56) References Cited

U.S. PATENT DOCUMENTS

| | | | | |
|---|---|---|---|---|
| 8,570,144 B2 * | 10/2013 | Nowottnick | .......... | H04W 12/06 |
| | | | | 340/5.61 |
| 10,476,156 B1 * | 11/2019 | Fleischhacker | ...... | H04B 7/0617 |
| 11,232,658 B2 * | 1/2022 | Kelly | .................... | B60R 25/245 |
| 2016/0148448 A1 * | 5/2016 | Blatz | .................. | G06K 7/10257 |
| | | | | 340/5.61 |
| 2018/0276923 A1 * | 9/2018 | Hayashi | ................ | B60R 25/246 |
| 2019/0114857 A1 * | 4/2019 | Gustin | ............... | G07C 9/00658 |
| 2019/0143942 A1 * | 5/2019 | Neuhoff | ............. | G07C 9/00309 |
| | | | | 340/5.72 |
| 2020/0346616 A1 * | 11/2020 | Kelly | ..................... | B60R 25/30 |

FOREIGN PATENT DOCUMENTS

EP           2635059 A1    9/2013
EP           2498226 A3    1/2017

\* cited by examiner

FIELD SUPERPOSITION METHOD AND SYSTEM

FIELD

The disclosure relates to wireless communications, and in particular to field superposition in wireless communications for ensuring source security.

BACKGROUND

Certain classes of wireless communications systems employ transponders and base stations that communicate with each other. In one example, a wireless transponder may be used to enable passive keyless entry (PKE) for unlocking the doors of a vehicle, or passive keyless go (PKG) for enabling an ignition circuit. In each case, the wireless transponder communicates with a base station in the vehicle in a series of operations that are intended to authenticate the transponder and ensure that the transponder is within a defined distance of the vehicle.

PKE and PKG systems can be susceptible to so-called relay attacks, in which signals transmitted by transceivers in a vehicle are relayed by an attacker to and from a transponder that may be at a remote location, for example inside the vehicle owner's house or on the owner's person. The attacker may be able to access the vehicle by relaying signals between the transponder and the vehicle to gain entry and to enable the vehicle ignition circuit.

One method of reducing susceptibility to such relay attacks is to employ multiple antennae in the vehicle, which together provide a challenge signal to a transponder. Upon receiving the challenge signal, the transponder determines a strength of the received signals in three orthogonal directions using three antennae arranged to receive signals in mutually orthogonal directions. The transponder then responds by transmitting an encoded signal containing the measurements, and a controller in the vehicle determines from the received signal whether the vector information meets predetermined criteria, and enables access to the vehicle, for example to unlock or enable the ignition circuit, only if the criteria are met. Such a system is disclosed in EP1189306A1.

Further methods for reducing susceptibility to relay attacks may involve generating superposed signals from two or more antennae in a vehicle, and determining whether a transponder is within physical range of the vehicle, for example as disclosed in EP2635059A1. In such a system, first and second signals may be transmitted sequentially from first and second antennae, followed by a third signal transmitted from both antennae. The third signal is required to deliver at least two valid vector components that are above the noise level at the receiver (i.e. the transponder) to defend against a relay attack. If this criterion is not met, the vehicle controller determines that the transponder response is not valid and does not enable access to the vehicle. A problem with this approach is that in some cases a valid transponder in a valid location, i.e. within proximity of the vehicle, may receive a superposition of signals that does not result in two or more vector components above the noise level, and the vehicle controller incorrectly refuses access.

SUMMARY

In accordance with a first aspect there is provided a method of wireless communication between a vehicle base station and a transponder, the method comprising:

i) driving first and second antennae on the vehicle by the vehicle base station using first driving currents, the first antenna being separated from the transponder by a portion of a vehicle in which the vehicle base station resides;

ii) detecting three separate mutually orthogonal vector components of the respective fields emitted by the first and second antennae and received at the transponder;

iii) calculating superposition factors for the first and second antennae based upon the separate vector components;

iv) concurrently driving the first and second antennae using the same phase, respectively using the first driving currents multiplied by the calculated superposition factors;

v) detecting three mutually orthogonal vector components of a superposed signal including signals from both antennae received at the transponder;

vi) determining whether two of the three detected vector components are above a threshold noise level;

vii) if fewer than two of the three detected vector components are above the threshold noise level, repeating step iv) with one of the first and second antennae being driven by the first driving current multiplied by the calculated superposition factors and by an adjustment factor; and viii) if two of the three detected vector components are above the threshold noise level, authenticating the transponder in response to the detected superposed vector components being within an error-based range of the sum of the separate vector components for each of the first and second antennae as multiplied respectively by the superposition factors for the first and second antennae.

An advantage of the above defined method is that account can be taken of the presence of 'black holes', being regions where the transponder may determine that a superposed signal effectively cancels out to leave a signal having a vector in only one direction, which would otherwise prevent authentication from occurring.

The adjustment factor may increase or decrease a signal strength magnitude emitted from the one of the first and second antennae, for example by 10% or more. The adjustment factor may for example increase or decrease a signal strength magnitude emitted from the one of the first and second antennae by up to around 30%, 50% or up to 75%.

The method may further comprise unlocking the vehicle upon authenticating the transponder and/or activating an ignition circuit of the vehicle.

In some examples step iv) may be repeated no more than once. If, after repeating the step, there is still no more than one detected vector component are above the threshold noise level, the possibility of the transponder actually being in a valid location is very low.

In other examples if, after repeating step iv), fewer than two of the three detected vector components are above the threshold noise level, the adjustment factor may be changed and step iv) repeated again. In such cases step iv) may be repeated no more than twice, given that the possibility of the transponder being in a valid location after still not recognising the required number of vector components will be very low.

In accordance with a second aspect there is provided a system for wireless authentication of a transponder, the system comprising:

a base station mounted on a vehicle; and first and second antennae connected to the base station and mounted at separate positions on the vehicle, wherein the base station is configured to:

i) drive the first and second antennae using first driving currents;
ii) detect a signal from the transponder encoding three mutually orthogonal vector components of the respective fields emitted by the first and second antennae received at the transponder;
iii) calculate superposition factors for the first and second antennae based upon the separate vector components;
iv) concurrently drive the first and second antennae using the same phase, respectively using the first driving currents multiplied by the calculated superposition factors;
v) detect a signal from the transponder encoding three mutually orthogonal vector components of a superposed signal including signals from both antennae received at the transponder;
vi) determine whether two of the three detected vector components are above a threshold noise level;
vii) if fewer than two of the three detected vector components are above the threshold noise level, repeat step iv) with one of the first and second antennae being driven by the first driving current multiplied by the calculated superposition factors and by an adjustment factor; and
viii) if two of the three detected vector components are above the threshold noise level, authenticate the transponder in response to the detected superposed vector components being within an error-based range of the sum of the separate vector components for each of the first and second antennae as multiplied respectively by the superposition factors for the interior and exterior antennas.

The adjustment factor may increase or decreases a signal strength magnitude emitted from the one of the first and second antennae, for example by 10% or more. The adjustment factor may for example increase or decrease a signal strength magnitude emitted from the one of the first and second antennae by up to 30%, 50% or up to 75%.

The base station may be configured to cause the vehicle to be unlocked upon authentication of the transponder and/or cause an ignition circuit of the vehicle to be activated.

In some examples the base station may be configured to repeat step iv) no more than once.

In other examples if, after repeating step iv), fewer than two of the three detected vector components are above the threshold noise level, the base station may be configured to change the adjustment factor and repeat step iv) again. In such cases the base station may be configured to repeat step iv) no more than twice.

In accordance with a third aspect there is provided a computer program comprising instructions that, when executed, cause a processor for a vehicle base station to perform the method according to the first aspect.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
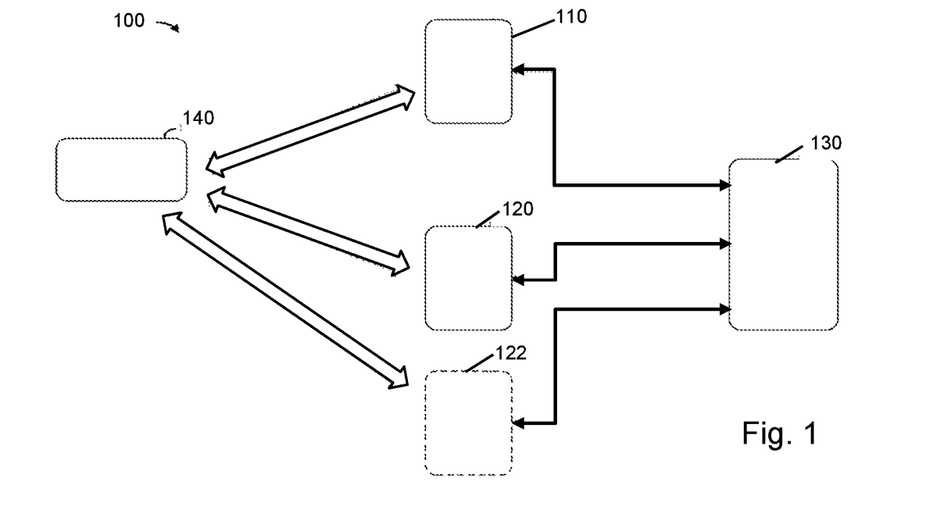
FIG. 1 illustrates an example wireless system with field superposition.

FIG. 1 shows an example wireless system 100 with field superposition. The system 100 includes first and second antennae 110, 120, which may be respectively a main antenna 110 and an interior antenna 120. The antennae 110, 120 pass signals from a base station/controller 130 to a remote transponder 140. The interior antenna 120 is shielded, such as by a vehicle shell or other component, from direct access by the transponder 140.

The base station 130 drives the main and interior antennae 110 and 120, and the transponder 140 detects the signals from the antennae, including vector components for each signal. The transponder 140 communicates encrypted information characterizing these detected signals back to the base station 130, which uses the information to generate field superposition factors for use in driving each antenna. The base station 130 further encrypts and sends the superposition factors to the transponder 140.

The base station 130 then applies the respective superposition factors to drive each antenna at the same time in-phase. The transponder 140 detects the superposed signal, which is used together with the superposition factors to determine whether the superposed signal, including a combined signal from each antenna, is within an error factor. In some implementations, the superposed signal is authenticated by determining whether each of three vector components (e.g., x, y and z) is within an error factor for that vector.

If the combined signal is within the error factor, the transponder is authenticated. This authentication can be used, for example, to operate or enable a system, such as an entry/locking mechanism or an ignition mechanism. In addition, calculations for authenticating the signal can be made at one or both of the transponder and the base station, with the transponder communicating information characterizing the received signals to the base station for such a calculation in the latter example.

Figure 2:
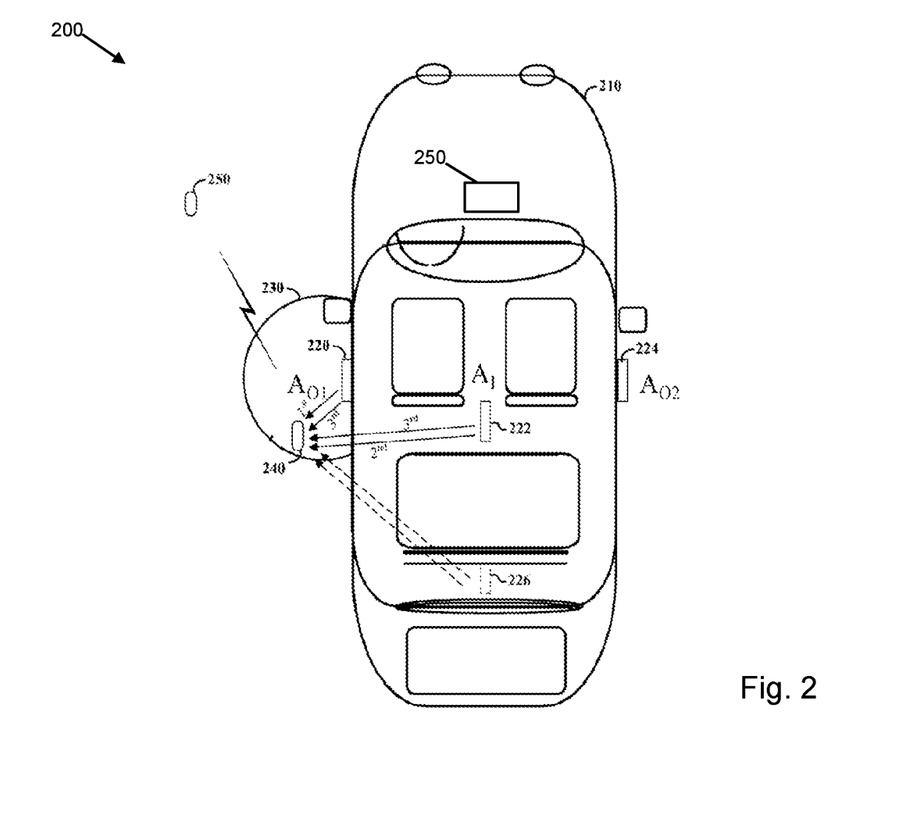
FIG. 2 illustrates a wireless automotive system with field superposition.

FIG. 2 shows an example wireless automotive system 200 with field superposition. The system 200 includes a base station 250 within a vehicle 210, an external first antenna 220 and an internal second antenna 222. An optional external third antenna 224 is located opposite the first antenna 220, relative to the vehicle 210. The positioning of the respective antennas can be varied to suit different embodiments and application to different types of vehicles 210, with both the vehicle and the antenna positioning being exemplary of a multitude of vehicles and antenna configurations (with the first antenna 222 being shielded).

The first and second antennae 220, 222 are each configured to transmit a signal that is detectable by a transponder 240 within the indicated driver detection area 230, which may for example be within range of a door handle of the vehicle 210. When used, an external fourth antenna 226 may be also configured to transmit a signal to a transponder 240 within the driver detection area 230.

The vehicle 210 shields the interior second antenna 222 from an external transponder, such that a signal from the interior second antenna 222 is not directly detectable by a transponder in the driver detection area 230. For example, glass, metal or other components of the vehicle 210 may distort the signal sent by the interior antenna 222, such that the transponder 240 does not directly detect the signal as generated at the antenna 222.

By way of example, a transponder 240 is shown placed in the driver detection area 230, representing an exemplary interaction with the system 200. Optionally, the transponder 240 is part of the system, and operates to communicate signals with the base station 250 in the vehicle 210, via one or both antennae 220 and 222 (or 224 where implemented). As in the system 100 in FIG. 1, the base station 250 is connected to each of the antennae 220, 222 (and 224, 226 where implemented) to send and receive signals via the antennae.

The base station 250 (e.g., a circuit within the vehicle 210) drives the antennae 220 and 222 at an initial transmission current for each antenna (e.g., the currents may be different, with the antennas subsequently driven). Signals with respective vector components corresponding to each antenna 220 and 222 are detected at a transponder (such as 240) and sent back (e.g., encrypted) to the base station in vehicle 210. The base station uses the detected vector components for each antenna 220 and 222, together with a random field strength value (high enough to account for noise/errors), to generate field strength factors to apply to respective signals used to subsequently drive each of the antennae.

The base station 250 then drives the antennae 220 and 222, at the same time and with the same phase, with a current, for each antenna, that respectively corresponds to the initial current previously applied to that antenna, multiplied by the field strength factor for that antenna. The superposed signal detected at the transponder is processed with error data corresponding to the respective antennas, and the known field strength factors for each antenna to determine a condition of authenticity of the transponder 240.

Such authenticity may be determined, for example, as determining whether the transponder 240 receiving and processing the signal is in the driver detection area 230, or has received a signal in this detection area as detected by a relaying transponder. For instance, where transponder 240 is a relaying transponder, and a transponder 250 is actually authenticated for the vehicle 210 but is out of the driver detection area 230, the relaying transponder 240 is incapable of generating the fields from each antenna with respective vector values.

Further details of the method of transponder authentication using superposition are disclosed in EP2498226A2, from which FIGS. 1 and 2 and the above passages are derived.

Figure 3:
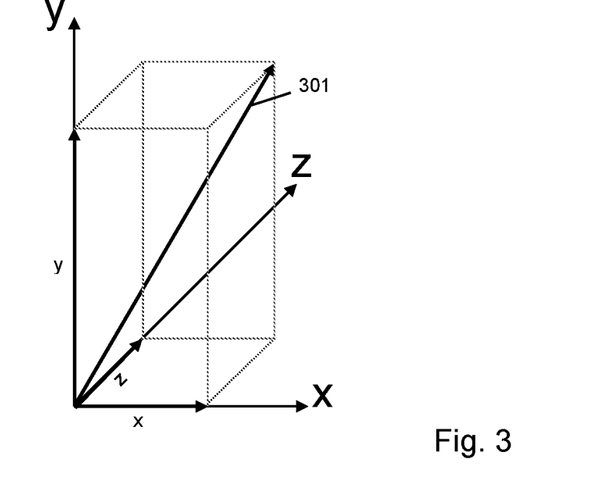
FIG. 3 is a schematic diagram illustrating vector components of a received signal.

FIG. 3 illustrates schematically how a vector 301 representing the strength and direction of a signal may be broken down into three components x, y, z along respective mutually orthogonal axes, the vector 301 representing a geometric sum of the three components.

Figure 4:
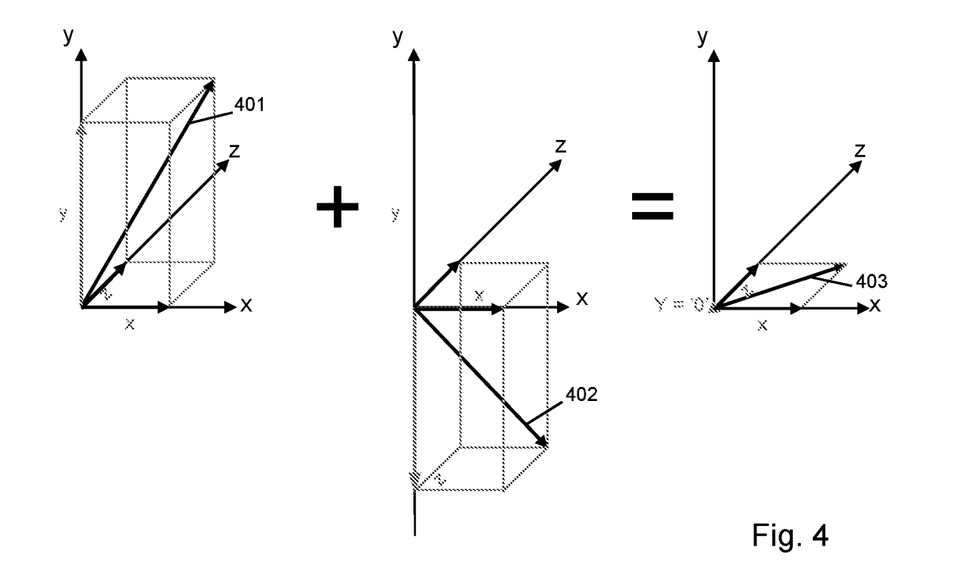
FIG. 4 is a schematic diagram illustrating superposition of vector components of signals from first and second antennae.

FIG. 4 illustrates schematically the effect of superposition of signals transmitted by first and second antennae, which may for example be the first and second antennae 220, 222 of the example system 200 shown in FIG. 2 or the first and second antennae 110, 120 of the system 100 shown in FIG. 1. In each case the signal shown is that received by the transponder 240, 110, which is located at an unknown position relative to the antennae. The signal 401 from the first antenna is superposed with the signal 402 from the second antenna, resulting in the superposed signal 403. Because the y components of the first and second signals 401, 402 are sufficiently close in magnitude, they effectively cancel each other out, resulting in the y component of the superposed signal 403 being null. In practice, a null result will result if the superposed signal results in a component being below a threshold noise level. The resulting superposed signal 403 consequently effectively contains only two components, in this case in the x and z directions.

In some cases more than one component of the first and second signals 401, 402 may cancel out, resulting in null components on two axes and only a single resulting component. In accordance with the above mentioned authentication process, this would be interpreted as resulting from a relay station attack, and the transponder would not be authenticated. Depending on the specific field pattern resulting from the antenna positions, vehicle configuration and surrounding environment, there may exist multiple relative locations and orientations where a transponder will not be authenticated due to the superposition of signals resulting in a component along only one axis. To take into account the possibility of there being such 'black holes' where the transponder will not be authenticated if a response from the transducer results in fewer than two components above a threshold noise level being detected, an additional sequence of operations may be included in a method of authenticating the transponder.

Figure 5:
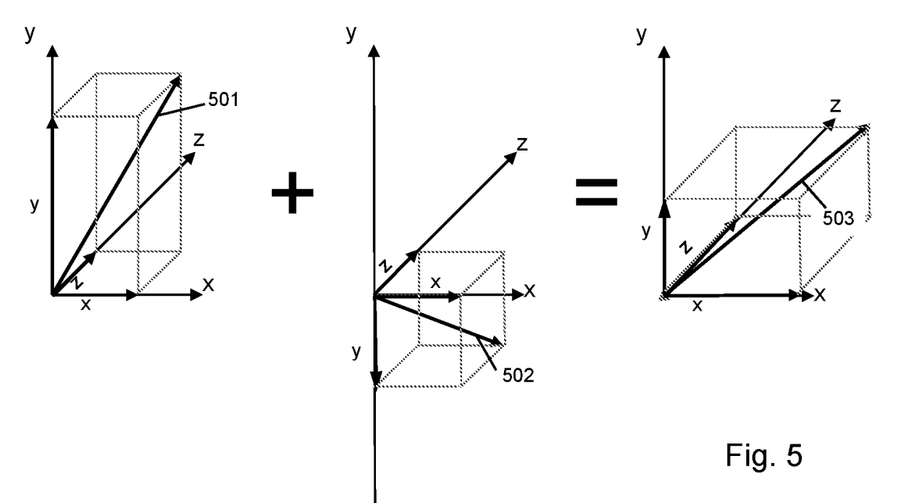
FIG. 5 is a schematic diagram illustrating superposition of vector components of signals from first and second antennae, with one signal adjusted to avoid a null vector component in the superpositioned signal.

FIG. 5 illustrates schematically the effect of applying an adjustment factor to one of the signals transmitted by the antennae. In this case, the signal 502 from the second antenna is reduced in magnitude, for example by around 50%, while the signal 501 from the first antenna is maintained at the same level as previously. The resulting superposed signal 503 now has components in all three orthogonal axes that are above a noise level. Consequently, the resulting signal transmitted from the transponder to the base station may result in the transponder being authenticated and access allowed to the vehicle.

The signal from the second antenna may be reduced by reducing the current supplied to the antenna by the base station. The signal may alternatively be increased to provide the same effect. A difference in magnitude between the current supplied to the second antenna may be at least 10%, and may be up to around 30%, 50% or up to 75%.

Figure 6:
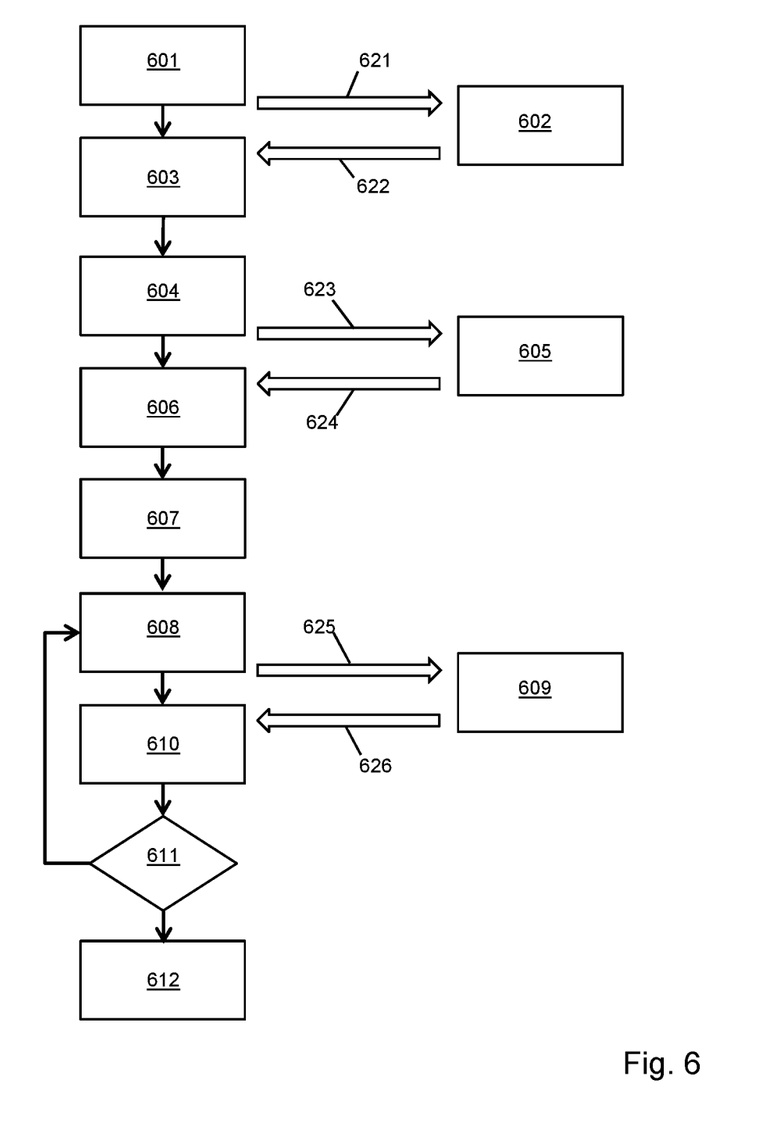
FIG. 6 is a schematic flow diagram illustrating an example method of authenticating a wireless transponder using field superposition.

FIG. 6 is a schematic diagram illustrating a series of steps involved in an example method of authenticating a transponder, with the left hand side indicating operations performed at the base station and antennae, and the right hand side indicating operations performed by the transponder. In a first step 601 a first transmission 621 is initiated from the first antenna. This transmission 621 is received 602 by the transponder, which then responds by transmitting a signal 622 encoding the vector components of the received signal. This signal 622 is received 603 by the first antenna. At step 604 a second transmission 623 is initiated from the second antenna. This second transmission 623 is received 605 at the transponder, which then responds by transmitting a signal 624 encoding the vector components of the received signal. This signal 624 is received at step 606 by the second antenna. The base station then, at step 607, calculates superposition factors for the first and second antennae based upon the separate vector component information received from the transponder and at step 608 concurrently drives the first and second antennae using the same phase, respectively using the driving currents for the first and second transmissions multiplied by the calculated superposition factors, sending a superposed signal 625 to the transponder. The superposed signals are detected 609 by the transponder, which then responds by transmitting a signal 626 encoding the vector components of the received signal, the signal 626 being received 610 at the base station. At step 611 the base station determines whether two of the three detected vector components are above a threshold noise level. If fewer than two of the three detected vector components are above the threshold noise level, step 608 is repeated with one of the first and second antennae driven by the first driving current multiplied by the calculated superposition factors and by an adjustment factor. If two of the three detected vector components are above the threshold noise level, at step 612 the base station authenticates the transponder in response to the detected superposed vector components being within an error-based range of the sum of the separate vector components for each of the first and second antennae as multiplied respectively by the superposition factors for the first and second antennae. The base station may then unlock the vehicle and/or enable the ignition circuit of the vehicle.

In the unlikely event that repeating step 608 with an adjustment factor still does not result in two detected vector components being above the threshold noise level, the base station may alter the adjustment factor and repeat the step. Otherwise the base station may refuse to authenticate the transponder, and the process starts again.

From reading the present disclosure, other variations and modifications will be apparent to the skilled person. Such variations and modifications may involve equivalent and other features which are already known in the art of wireless communications, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

What is claimed is:

1. A method of wireless communication between a vehicle base station and a transponder, the method comprising:
   i) driving first and second antennae on the vehicle by the vehicle base station using first driving currents, the first antenna being separated from the transponder by a portion of a vehicle in which the vehicle base station resides;
   ii) detecting three separate mutually orthogonal vector components of the respective fields emitted by the first and second antennae and received at the transponder;
   iii) calculating superposition factors for the first and second antennae based upon the separate vector components;
   iv) concurrently driving the first and second antennae using the same phase, respectively using the first driving currents multiplied by the calculated superposition factors;
   v) detecting three mutually orthogonal vector components of a superposed signal including signals from both antennae received at the transponder;
   vi) determining whether two of the three detected vector components are above a threshold noise level;
   vii) if fewer than two of the three detected vector components are above the threshold noise level, repeating step iv) with one of the first and second antennae being driven by the first driving current multiplied by the calculated superposition factors and by an adjustment factor; and
   viii) if two of the three detected vector components are above the threshold noise level, authenticating the transponder in response to the detected superposed vector components being within an error-based range of the sum of the separate vector components for each of the first and second antennae as multiplied respectively by the superposition factors for the first and second antennae.

2. The method of claim 1, wherein the adjustment factor increases or decreases a signal strength magnitude emitted from the one of the first and second antennae by 10% or more.

3. The method of claim 2, wherein the adjustment factor increases or decreases a signal strength magnitude emitted from the one of the first and second antennae by up to 30%, 50% or up to 75%.

4. The method of claim 1 comprising unlocking the vehicle upon authenticating the transponder.

5. The method of claim 1, wherein step iv) is repeated no more than once.

6. The method of claim 1 wherein if, after repeating step iv), fewer than two of the three detected vector components are above the threshold noise level, the adjustment factor is changed and step iv) repeated again.

7. The method of claim 6, wherein step iv) is repeated no more than twice.

8. A system for wireless authentication of a transponder, the system comprising:
a base station mounted on a vehicle; and
first and second antennae connected to the base station and mounted at separate positions on the vehicle,
wherein the base station is configured to:
i) drive the first and second antennae using first driving currents;
ii) detect a signal from the transponder encoding three mutually orthogonal vector components of the respective fields emitted by the first and second antennae received at the transponder;
iii) calculate superposition factors for the first and second antennae based upon the separate vector components;
iv) concurrently drive the first and second antennae using the same phase, respectively using the first driving currents multiplied by the calculated superposition factors;
v) detect a signal from the transponder encoding three mutually orthogonal vector components of a superposed signal including signals from both antennae received at the transponder;
vi) determine whether two of the three detected vector components are above a threshold noise level;
vii) if fewer than two of the three detected vector components are above the threshold noise level, repeat step iv) with one of the first and second antennae being driven by the first driving current multiplied by the calculated superposition factors and by an adjustment factor; and
viii) if two of the three detected vector components are above the threshold noise level, authenticate the transponder in response to the detected superposed vector components being within an error-based range of the sum of the separate vector components for each of the first and second antennae as multiplied respectively by the superposition factors for the interior and exterior antennas.

9. The system of claim 8, wherein the adjustment factor increases or decreases a signal strength magnitude emitted from the one of the first and second antennae by 10% or more.

10. The system of claim 9, wherein the adjustment factor increases or decreases a signal strength magnitude emitted from the one of the first and second antennae by up to 30%, 50% or up to 75%.

11. The system of claim 8, wherein the base station is configured to cause the vehicle to be unlocked upon authentication of the transponder.

12. The system of claim 8, wherein the base station is configured to repeat step iv) no more than once.

13. The system of claim 8 wherein if, after repeating step iv), fewer than two of the three detected vector components are above the threshold noise level, the base station is configured to change the adjustment factor and repeat step iv) again.

14. The system of claim 13, wherein the base station is configured to repeat step iv) no more than twice.

15. A non-transitory computer readable medium comprising instructions that, when executed, cause a processor for a vehicle base station to drive first and second antennae on the vehicle using first driving currents, the first antenna being separated from the transponder by a portion of a vehicle in which the vehicle base station resides;
detect three separate mutually orthogonal vector components of the respective fields emitted by the first and second antennae and received at the transponder;
calculate superposition factors for the first and second antennae based upon the separate vector components;
concurrently drive the first and second antennae using the same phase, respectively using the first driving currents multiplied by the calculated superposition factors;
detect three mutually orthogonal vector components of a superposed signal including signals from both antennae received at the transponder;
determine whether two of the three detected vector components are above a threshold noise level;
if fewer than two of the three detected vector components are above the threshold noise level, repeating concurrently driving the first and second antennae with one of the first and second antennae being driven by the first driving current multiplied by the calculated superposition factors and by an adjustment factor; and
if two of the three detected vector components are above the threshold noise level, authenticating the transponder in response to the detected superposed vector components being within an error-based range of the sum of the separate vector components for each of the first and second antennae as multiplied respectively by the superposition factors for the first and second antennae.

16. The non-transitory computer readable medium of claim 15, wherein the adjustment factor increases or decreases a signal strength magnitude emitted from the one of the first and second antennae by 10% or more.

17. The non-transitory computer readable medium of claim 16, wherein the adjustment factor increases or decreases a signal strength magnitude emitted from the one of the first and second antennae by up to 30%, 50% or up to 75%.

18. The non-transitory computer readable medium of claim 17, wherein the base station is configured to cause the vehicle to be unlocked upon authentication of the transponder.

19. The non-transitory computer readable medium of claim 18, wherein the base station is configured to repeat step iv) no more than once.

20. The non-transitory computer readable medium of claim 18 wherein if, after repeating step iv), fewer than two of the three detected vector components are above the threshold noise level, the base station is configured to change the adjustment factor and repeat step iv) again.

* * * * *